Aug. 24, 1954
W. E. MARTIN
2,687,225
MOBILE TRAILER BRIDGE
Filed Sept. 14, 1951
4 Sheets-Sheet 4
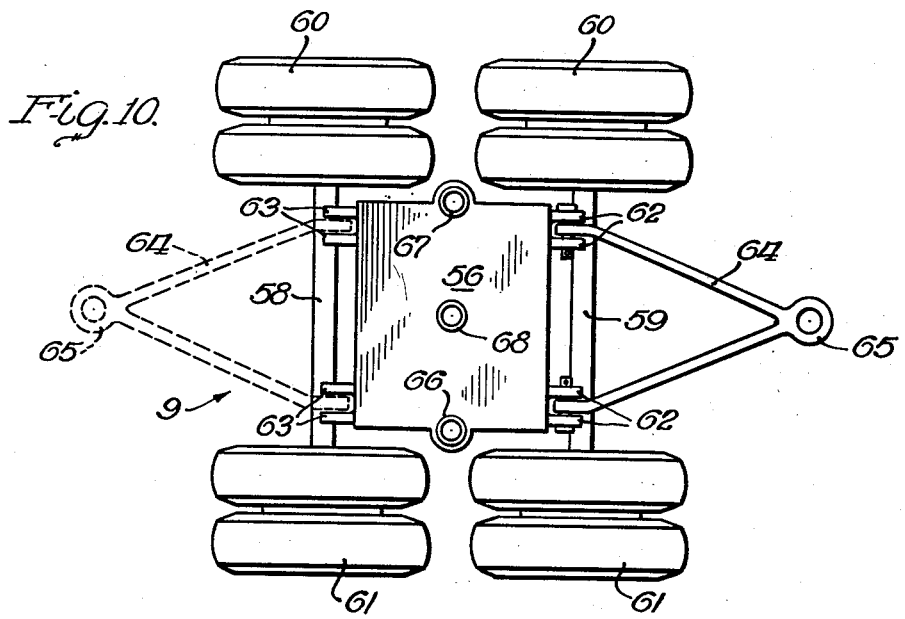
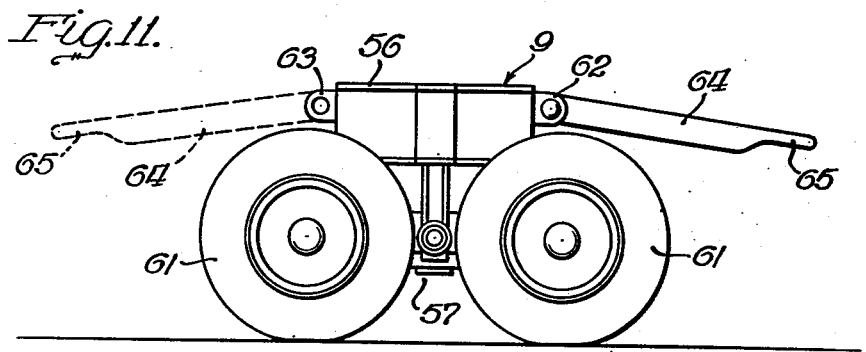
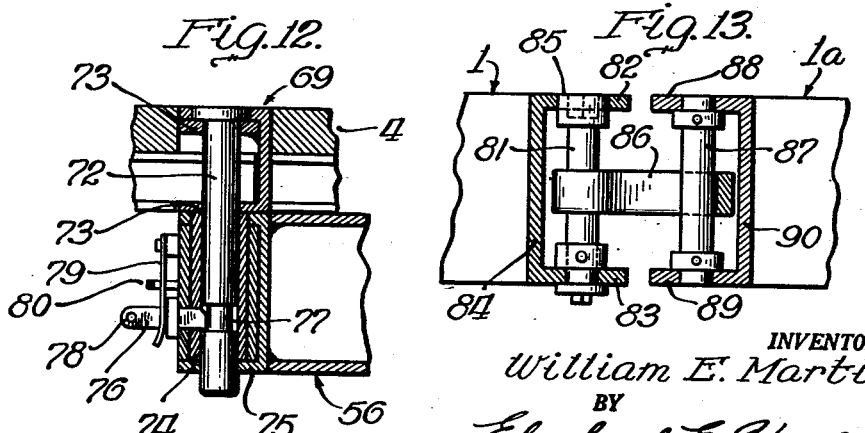
INVENTOR.
William E. Martin
BY
Eberhard E. Wettey
Atty.

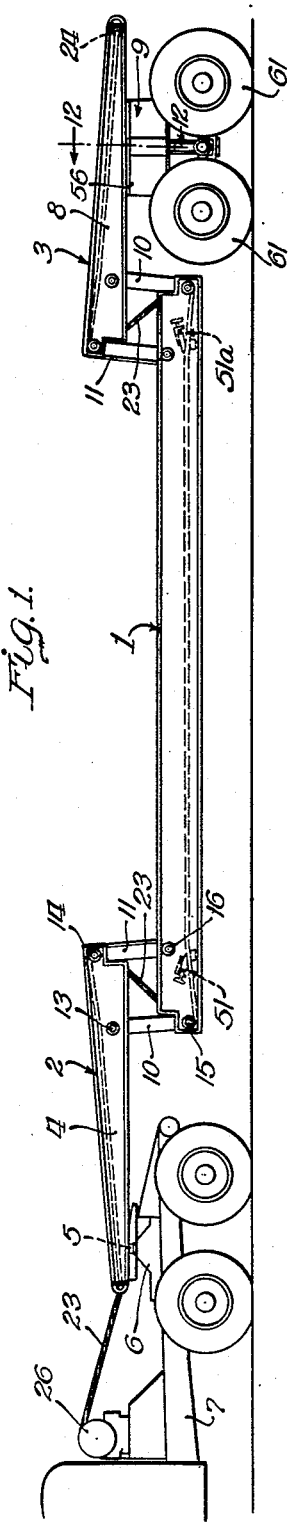
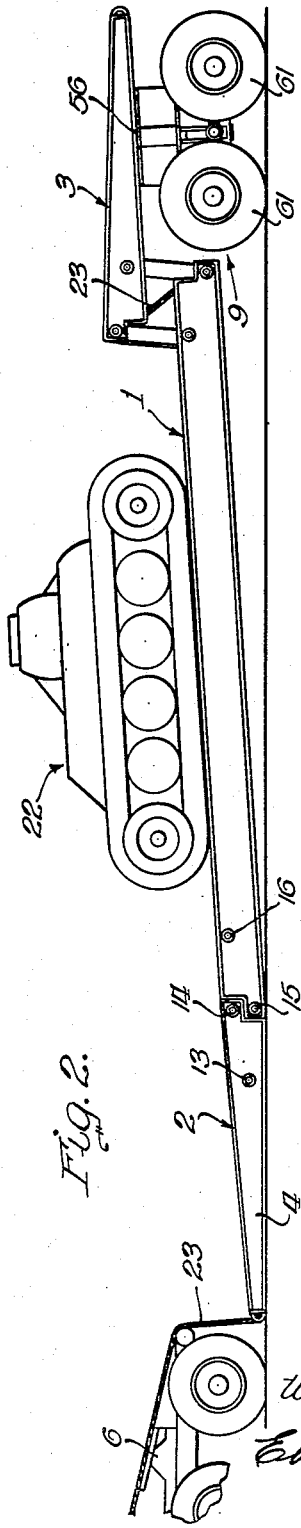
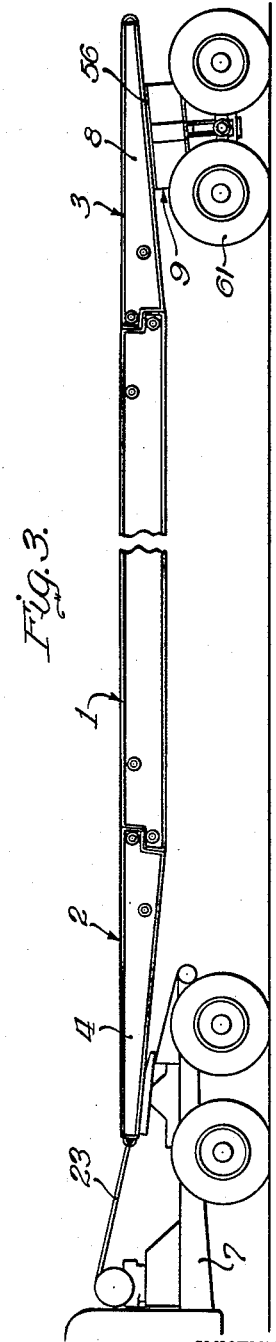

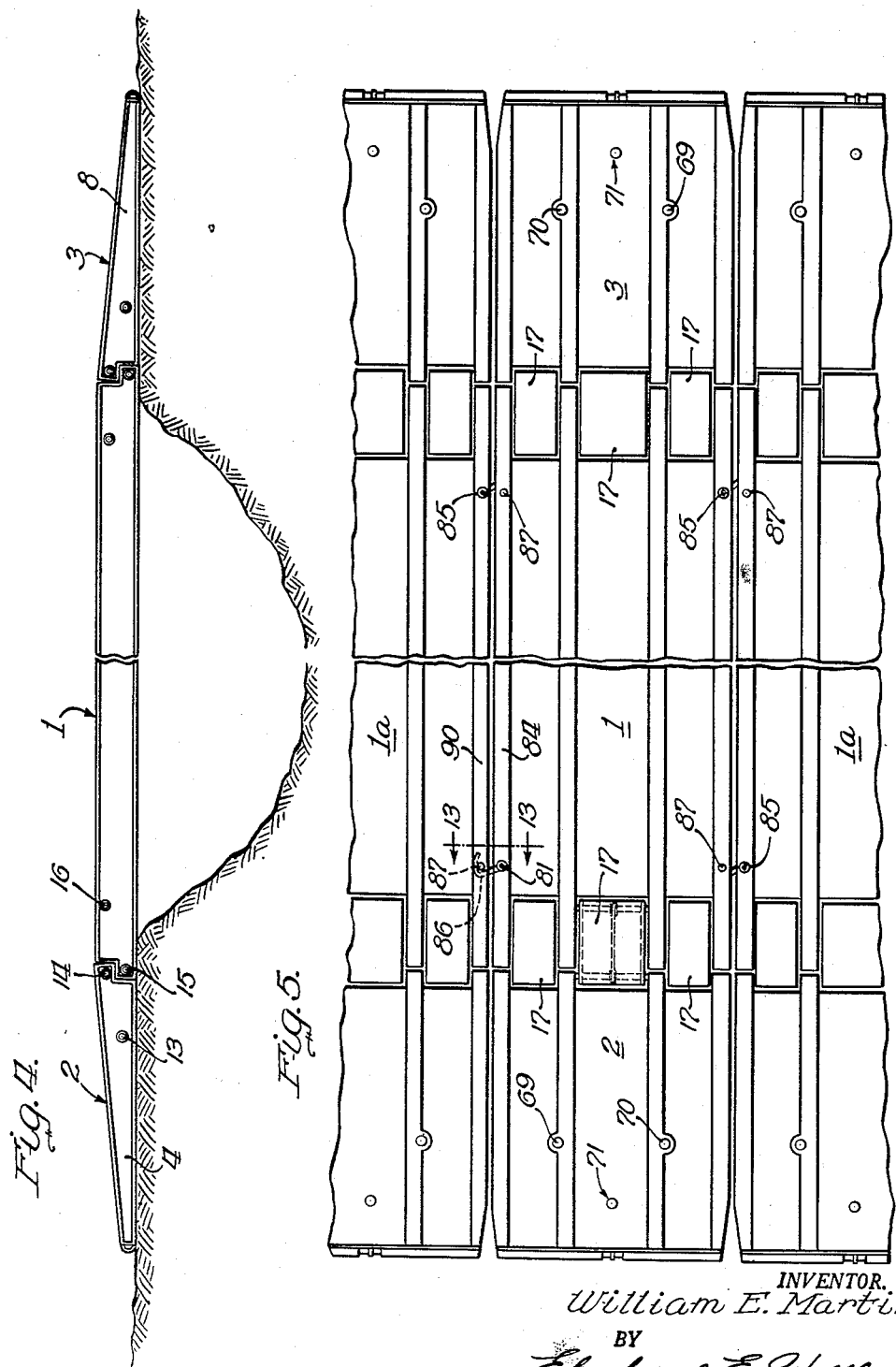

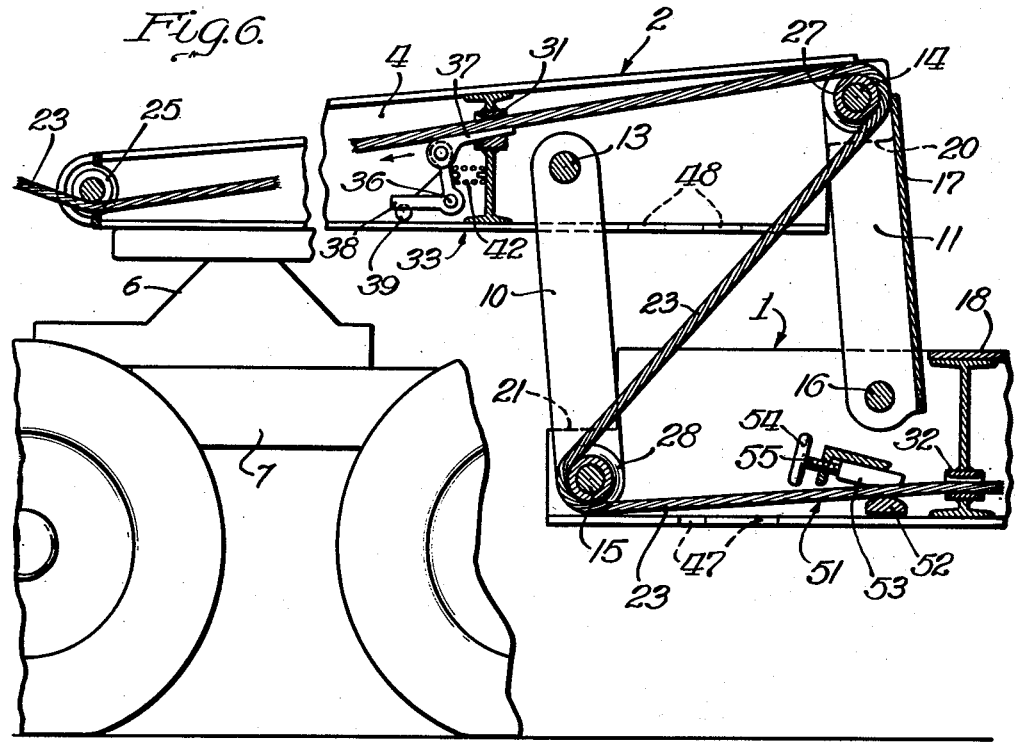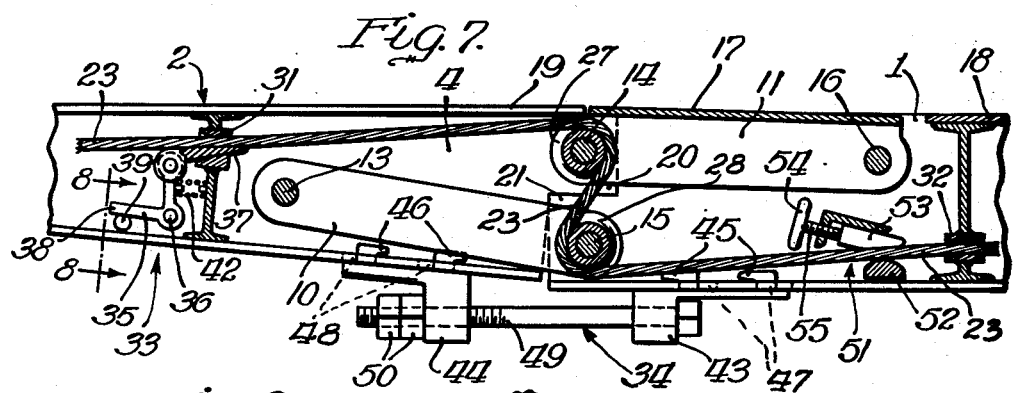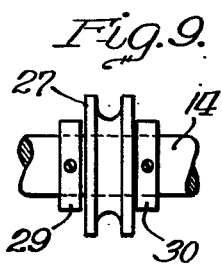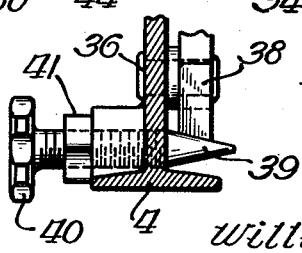

Patented Aug. 24, 1954

2,687,225

UNITED STATES PATENT OFFICE 2,687,225

MOBILE TRAILER BRIDGE

William E. Martin, Kewanee, Ill.

Application September 14, 1951, Serial No. 246,535

19 Claims. (Cl. 214—505)

This invention relates to a mobile trailer that can be converted into a number of different arrangements to comply with a number of different uses.

More specifically, the trailer of the present invention comprises a mobile unit that can be used as a low bed heavy equipment carrying vehicle, as a high bed equipment carrying vehicle generally known as a platform trailer, or one that may be converted into a bridge.

One of the main objects of the present invention is to provide a heavy equipment hauling trailer or the like comprising a bed with a gooseneck structure connected with each end of such bed.

Another object of the present invention is to provide a trailer having a low equipment hauling bed with goosenecks at each end thereof and which incorporates operative mechanism for raising the bed between the low hauling position thereof and into a coplanar position with respect to the level of the gooseneck hitch structures.

Another object of the present invention is to provide a trailer having a bed with foldable goosenecks connected with each end thereof and which gooseneck structures include hitching tongues that each provide a ramp for the opposite ends of the bed when the goosenecks are lowered into the plane of the bed.

A still further object of the present invention is to provide a trailer that will elevate the bed into the levels of the positions of the gooseneck towing hitch structures, thus providing an elevating arrangement to change the position of the bed between predetermined levels for loading or unloading when considered in relation to a loading platform, such trailer also being convertible into a platform trailer when said bed is raised to its maximum height with respect to the goosenecks.

Another object is to provide a trailer of this type with goosenecks at each end thereof and to arrange such goosenecks for releasable connections with wheeled units.

Another object of the invention is to provide means for connecting a wheeled unit with either of the goosenecks to provide a rear wheel tandem axle structure as a non-swivelling tracking arrangement for supporting a gooseneck and the adjacent end of the bed for transportation.

A further object of the present invention is to provide each of the goosenecks with an arrangement for connecting with a wheeled unit by means of the hitch structure through the use of cooperative means for supporting the gooseneck upon the wheeled unit and to permit swivelling of such unit with respect to the gooseneck.

A still further object of the present invention is to provide a mobile trailer with a bed as a deck with a foldable hitching structure at its ends that are each arranged for collapsing into coplanar relation with respect to the bed to thus form deck approaches at each end of the bed to thereby convert the mobile trailer into a bridge.

It is a further object of the present invention to provide the trailer bed with cooperative devices at the edges thereof which can be used to secure adjacently disposed trailer beds together when two or more of such bridge forming trailers are used as a wider bridging structure.

All other objects and advantages relating to the present invention in the form of a multiple purpose trailer shall hereinafter appear in the following detailed description having reference to the accompanying drawings forming a part of this specification.

In the drawings:

Fig. 1 is a side elevational view of the trailer constructed according to the principles of the present invention and illustrating the use thereof as a heavy equipment hauling trailer;

Fig. 2 is a side elevational view of the same trailer illustrated in Fig. 1, but with one of the goosenecks collapsed or folded downwardly and outwardly toward the ground to provide a ramp to load or unload equipment from the adjacent end of the bed.

Fig. 3 is a side elevational view of the same trailer but with the bed raised to the levels of the hitching structures of the goosenecks to illustrate the conversion of the Fig. 1 trailer into a platform type of trailer;

Fig. 4 illustrates a side elevational view of the trailer of the present invention as the same would appear when used as a bridge;

Fig. 5 is a plan view of the trailer illustrated in Fig. 4 and used as a bridge, this view also showing how two or more identical trailers may be used to increase the width of the bridge that may be formed by the trailers;

Fig. 6 is a fragmentary vertical cross sectional view taken longitudinally of the forward portion of the trailer to better illustrate certain details of construction thereof;

Fig. 7 is another fragmentary portion of the trailer structure as shown in Fig. 6 with the parts thereof occupying a changed position;

Fig. 8 is a detail cross sectional view to illustrate a part of the mechanism as seen substantially along the line 8—8 in Fig. 7;

Fig. 9 is a fragmentary detail view of one of the sheave units employed in the present construction;

Fig. 10 is a plan view of one of the wheeled units that is used to provide a mobile means for connection with one or both of the gooseneck structures of the present trailer;

Fig. 11 is a side elevational view of the wheeled unit;

Fig. 12 is a vertical cross sectional view of a fragmentary portion of the trailer substantially as viewed along the line 12—12 in Fig. 1; and Fig. 13 is a fragmentary cross sectional view of the connecting means employed between adjacently disposed trailer beds and substantially as viewed along the line 13—13 in Fig. 5.

Referring to Fig. 1, the trailer of the present invention comprises generally an equipment carrying bed 1 having a foldable gooseneck 2 connected with one end thereof and a like foldable gooseneck 3 connected with the other end of the bed 1 substantially as illustrated. The goosenecks 2 and 3 are substantially identical in construction, and when the trailer is arranged as illustrated in Fig. 1, the hitching tongue 4 is provided with a removable hitch pin 5 that is arranged for connection with a fifth wheel 6 supported upon a tractor vehicle 7, while the gooseneck 3 has a hitching tongue 8 arranged for suitable connection with a wheeled unit 9 in the form of a tandem axle structure that supports the rear end of the trailer in transportable relation for towing by the tractor 7. The hitch pin structure 5 may include an arrangement and design substantially as shown and described in my copending application Serial No. 220,388, filed April 11, 1951.

Since the goosenecks 2 and 3 are of identical construction, the same reference numerals will be used during the balance of the description regarding the operative mechanism comprising the goosenecks. In general, the gooseneck structure somewhat follows the design of the gooseneck shown and described in my copending application Serial No. 38,840, filed July 15, 1948, now Patent No. 2,611,496.

The hitching tongue 4 of the gooseneck 2 is connected with the bed 1 by means of swingable links such as 10 and 11 which are pivotally connected at their upper ends with transverse shafts 13 and 14 carried by the hitch tongue of the gooseneck 2 while the lower ends of the links are pivotally connected with the bed on the shafts 15 and 16. There are a number of pairs of links such as 10 and 11 spaced transversely of the gooseneck and bed and each of the pairs 10 and 11 are arranged together with their pivotal mountings to form a parallelogram framework, whereby the tongue 4 as shown in Fig. 6 can be brought forwardly and downwardly into the position shown in Fig. 7 to be positioned coplanar with the bed 1. It should also be noted that certain transverse pairs of the links 11 are connected by means of plates such as 17 to form a roadway to gap the space between the deck 18 of the bed 1 and the deck portion 19 of the hitch tongue 4. Such spanning plates 17 are also well illustrated in Fig. 5, which diagrammatically shows a plurality of adjacently disposed trailers with the goosenecks extended in folded and outward position.

It should also be noted that the rear end of the hitching tongue includes an overhang 20 which is arranged to meet and rest upon an offset 21 carried by the adjacent end of the bed so that when the gooseneck 2 is lowered as shown in Fig. 7, the overhang 20 will normally rest upon the offset 21. By arranging the pivotal mountings between the respective links 10 and 11 and the hitching tongue 4 and bed 1, with sufficient clearance it is possible to allow limited swinging of the tongue with respect to the bed so that the tongue may be made to occupy a slightly upward position as shown in Fig. 3 with respect to the bed or a slight downwardly angular position with respect to the bed as shown in Fig. 4. With each of the tongues being provided with the deck portion 19, both of these tongues provide loading ramps as approaches to the ends of the bed 1. Fig. 2 illustrates one end of the bed lowered to the ground with the gooseneck 2 folded downwardly and forwardly, in which position such gooseneck provides the ramp for loading or unloading vehicles such as 22 upon or off of the bed 1. When the trailer is arranged as shown in Fig. 1, the bed is suspended from each of the goosenecks 2 and 3 in pendulum fashion as determined by the pivotal link structure described. As in the normal set up of trailer and gooseneck, the trailer shown in Fig. 1 may be raised or lowered by means of a cable attached to the front end of the gooseneck such as 2. However, the present invention includes operable mechanism which is incorporated into the entire structure for connecting both goosenecks and the bed for the purpose of providing a means for raising the bed from a lowered position shown in Fig. 1 into a raised position as illustrated in Fig. 3, or for elevating or lowering the bed 1 into any intermediate position to that shown in Figs. 1 and 3 respectively. This mechanism comprises a cable 23 which is secured at 24 to a portion of the framework of the gooseneck 3, and this cable 23 is threaded over suitable sheave mechanism between the gooseneck 3 and the adjacent end of the bed 1 and passes through the bed structure to again be threaded over suitable sheave mechanism interposed between the gooseneck 2 and the adjacent bed 1, leading outwardly through the gooseneck 2 over a suitable head end roller or sheave 25 to be connected with a windlass arrangement 26 that is carried by the tractor 7. The sheave structures are identical and as illustrated in Fig. 6, a pulley or sheave 27 is rotatably mounted upon a pivot shaft 14 and a similar pulley or sheave 27 is mounted upon the pivot shaft 15. As illustrated in Fig. 9, any one of the sheave structures such as the sheave 27 can be adjustably arranged along the pivotal shaft 14 by means of collars 29 and 30 so that the cable can be threaded along a given predetermined plane in its operation in relation to the goosenecks and bed.

It should be understood that although one cable structure is being described, that it is possible to use two or more independently operable cables for connection with a windlass such as 26 or that two cables may be used with a Y connection joining up with a single cable for connection with the windlass.

It is preferable to thread the cable through suitable thimbles 31 arranged along the structure of the gooseneck 2 and similar thimbles such as 32 may be used in the framework of the bed 1 if desired to lead the cable through the bed structure.

If it is desirable to raise the elevation of the bed 1 from the position illustrated in Fig. 6 to the level of the gooseneck 2, this can be accomplished by a pull on the cable 23 through the use of power means such as the windlass 26.

This will cause the bed to raise through the diagonal positioning of cables 23 in each of the link mechanisms of the gooseneck structures to simultaneously position the bed in line with the gooseneck tongues 4, this action rolling the wheeled unit 9 rearwardly with respect to the tractor 7 for accommodating the additional length of the folded goosenecks 2 and 3. The general relationship of the left hand portion of the trailer is best illustrated in Fig. 7, and when the parts are in this position, they may be considered as having converted the normal trailer arrangement shown in Fig. 1 into a platform trailer arrangement illustrated in Fig. 3.

When the tongue 2 and bed 1 are in the position shown in Fig. 7, suitable locking means may be employed to maintain this particular relationship. This may be accomplished by the use of a cable lock mechanism 33 or by means of a fastening bolt arrangement 34 or by means of both. The cable lock mechanism merely comprises a rockable bell crank 35 which is pivotally mounted at 36 to insert or retract a wedge 37 from within the eye portion of the thimble 31 as controlled by means of the cam leg 38 of the bell crank 35. An adjustable screw cam 39 may be hand operated by means of the handle 40 and locked in position by means of a nut 41 to advance or retract the wedge 37. Normally, such wedge 37 is forced outwardly of the thimble 31 by means of an expansion spring 42 in which position the cable 23 will be free to move through the thimble 31 when the wedge 37 is released by the cam screw 39.

The fastening device 34 may comprise a pair of brackets 43 and 44 which are equipped with fastening hooks 45 and 46 respectively. These hooks of each bracket may be inserted through elongated openings such as 47 and 48 in the gooseneck framework and kept in attached positions by means of draw bolt 49 connecting the brackets 43 and 44 under the action of the tensioning nuts 50. The fastening device 34 may be repeated as several units across the width of the trailer to secure the bed 1 and gooseneck 2 together to hold the same in the occupied positions noted in Fig. 7.

In addition, the bed may be supplied at each end with a cable locking device 51 having a fixed bracket 52 with an adjustable cable clamp 53 operated by means of a hand wheel 54 through the screw connection at 55 with a structural member of the bed 1. By tightening up on the cable locking means 51 shown in Fig. 6, it is possible to only raise this end of the trailer bed 1 into raised position in line with the gooseneck 2. If the end of the cable secured at 24 can be arranged for releasable connection with the gooseneck 3, it would be possible to lock the cable clamp 51a shown in Fig. 1, thereby to raise the adjacent end of the bed 1 into the level of the gooseneck 3.

Referring to Figs. 10 and 11, the wheeled unit 9 comprises generally a supporting bolster 56 suitably supported by means of a tandem wheel structure 57 carried upon the axles 58 and 59 terminating in the wheeled units 60 and 61. Each end of the bolster 56 is provided with pairs of ears such as 62 and 63 for receiving a towing tongue such as 64 with a towing eye 65 by means of which the tandem unit may be drawn by a towing vehicle. Tongue 64 may be interchanged between opposite sides of the bolster 56 as illustrated in Figs. 10 and 11.

In addition, the bolster 56 is provided with spaced hitch pin receiving means 66 and 67 and with a central hitch pin unit 68. In direct cooperation with the bolster hitch pin arrangement, each of the gooseneck tongues 2 and 3 have their hitching tongues also arranged with hitch pin means 69 and 70 and with the removable hitch pin structure 71 previously described as carrying the removable hitch pin 5. Each of the cooperative hitch pin receiving structures of the bolster 56 and the tongue 2 are best illustrated in Fig. 12, and each comprises the use of a pin 72 which is dropped through aligned openings 73 in the hitch tongue 4 and which pin passes through a bushing 74 carried in the end channel 75 of the bolster 56. A releasable latch member 76 cooperates with an annular recess 77 on the pin 72 to lock the pin in place as shown. By grasping the cross bar 78 of the latch 76, it is possible to release the latch from the annular recess 77 against a leaf spring 79 that is secured to the bolster structure for limited retraction by means of a stop 80.

By using two pins such as 72 between the hitch means 69 and 70 of the gooseneck 2 and the hitch means 66 and 67 of the bolster 56, the wheeled unit 9 can be securely fastened to the adjacent gooseneck for tracking directly with the trailer as a rear wheel supporting structure and as the same is illustrated in Figs. 1, 2 and 3.

By using a similar hitch pin such as 72 illustrated in Fig. 12 through the releasable hitch pin structure 71 for cooperation with the hitch pin unit 68 of the bolster 56, it is possible to use the same wheeled unit as a mobile swivel means for supporting the adjacent tongue end of the trailer and for connection with a towing vehicle by means of the eye 65 of the tongue 64.

With this combination of elements as used, it is possible to provide one of the tongues of the trailer with a wheeled unit such as 9 that can be fixed thereto by using the space pin arrangement and by using a similar wheeled unit 9 at the other end of the trailer, the latter may be connected to swivel with respect to the tongue, thus using the same wheeled units for the transportable instrumentalities of the bed and its associated goosenecks.

The trailer, therefore, may be towed into any position or any location desirable and suitably removed from its connected wheeled units to dispose the same into the bridging arrangement illustrated in Fig. 4. This also may be accomplished through the use of a tractor vehicle such as 7 or by a derrick unit if feasible.

When the trailer is being used as a bridge as indicated in Fig. 4, it is possible to align several trailers in adjacently disposed relationship as illustrated in Fig. 5. When this particular arrangement is used, it is desirable to connect the beds together to maintain the same in an aligned relationship and this is accomplished by means of the construction illustrated in Figs. 5 and 13. The trailer bed 1 is provided with a vertical pivotal shaft 81 secured between the flanges 82 and 83 of the side channel 84 of the trailer bed. The upper end of the shaft 81 may be enlarged to include a socket arrangement 85 for the reception of a square ended tool that can be used to rotate the shaft 81. Preferably the fit of the pin or shaft parts may be relatively tight with respect to the channel 84 so that these parts will maintain and hold the positions into which they are moved. Shaft 81 has a centrally located hook 86 which can be used for engaging in back of a pin 87 which is also carried in position between the flanges 88 and 89 of the side flange 90 of the adjacent trailer bed 1a. By using a relatively narrow hook in the vertical direction, a certain amount of vertical disalignment between the trailer beds 1 and 1a can be accommodated. The normal connected relationship as illustrated in Fig. 13 may also be seen in Fig. 5 wherein the relationship of the parts is illustrated in plan view. Also, it should be noted that each side of the trailer bed is provided with one hook shaft 81 and one hook latching shaft 87 so that these latching devices will be arranged to cooperate with similar coacting latching devices on the next adjacent trailer bed.

The foregoing description and disclosure relates to a preferred embodiment of trailer arranged and designed to carry out the fundamental concept of the present invention. Certain changes and modifications are contemplated, however, in the exact design, structure and arrangement of the parts without departing from the invention. Such modified deviations shall, however, be governed by the breadth and scope of the trailer structure as hereinafter claimed.

What I claim is:

1. A trailer comprising a bed, and hitch units to transport said bed comprising a foldable gooseneck at one end of said bed, a foldable gooseneck at the other end of said bed, said bed being freely suspended from both of said goosenecks when the latter are disposed in raised transportable position, and operable cable mechanism interconnecting said goosenecks and the bed, said cable mechanism being constructed and arranged to elevate said bed from said freely suspended position to the transportation hitching level of said goosenecks to form a raised platform type trailer.

2. A trailer comprising a bed, a foldable gooseneck at one end of said bed, a foldable gooseneck at the other end of said bed, said bed being suspended from said goosenecks when the latter are disposed in raised transportable position, and operable means connected directly with both of said goosenecks and extending therebetween for operative connection with said bed and arranged to elevate said bed to the transportation hitching level of said goosenecks to form a raised platform type trailer, and locking mechanism for said operable means to maintain said bed and said goosenecks in said elevated relationship.

3. A trailer comprising a bed, and hitch units to transport said bed comprising a foldable gooseneck hitch at one end of said bed, a foldable gooseneck hitch at the other end of said bed, said bed being suspended from the hitching level of said goosenecks when the latter are disposed in raised transportable hitching and towing position, and operable means connecting said goosenecks and the bed arranged to elevate said bed from said suspended position to the transportation hitching level of said goosenecks to form a flat and continuous type of platform trailer together with said goosenecks, fastening devices releasably connecting each of said goosenecks with said bed to maintain said connected units in said elevated relation, and said operable means comprising a flexible cable.

4. A trailer comprising a bed, a foldable gooseneck at one end of said bed, a foldable gooseneck at the other end of said bed, said bed being suspended from said goosenecks when the latter are disposed in raised transportable position, and operable means connecting said goosenecks and the bed and arranged to elevate said bed to the transportation level of said goosenecks to form a platform trailer, and fastening devices releasably connecting each of said goosenecks with said bed to maintain said connected units in elevated relation, said operable means comprising a flexible cable, said cable having one end anchored to one gooseneck, and having its other end threaded through the end portion of the other of said goosenecks for connection with the trailer handling mechanism of a tractor.

5. A mobile trailer bridge comprising a bed to form the deck of the bridge, foldable goosenecks connected with opposite ends of the bed, ramp members connected with said goosenecks respectively and each providing deck approaches when said goosenecks are lowered to the level of the bed, and releasable joining devices carried at the sides of said bed for engagement with cooperative devices on an adjacently disposed bed to laterally connect adjacently arranged trailers when the latter form composite bridge units.

6. In a trailer, the combination of a bed, a foldable gooseneck connected with said bed, and operable mechanism connecting said bed and gooseneck and arranged to move said bed and gooseneck relatively to each other from transportable vertically spaced positions to aligned coplanar positions, said gooseneck comprising a hitch tongue, parallel links, and pivotal members connecting the ends of said links with said hitch tongue and bed respectively, and said operable mechanism comprising a cable having one end portion arranged for securement with respect to said bed, the other end portion passing through said hitch tongue and terminating with a free actuating end at the forward portion of the tongue, the intermediate portion of said cable being threaded over sheave means comprising sheaves connected with the head end of the bed and rear end of the hitch tongue respectively whereby said cable is disposed in diagonal fashion between opposite outward pivotal members when said bed and hitch tongue are vertically spaced while in transportable relation.

7. In a trailer, the combination of a bed, a foldable gooseneck connected with said bed, and operable mechanism connecting said bed and gooseneck and arranged to move said bed and gooseneck relatively to each other from transportable vertically spaced positions to aligned coplanar positions, said gooseneck comprising a hitch tongue, parallel links, and pivotal members connecting the ends of said links with said hitch tongue and bed respectively, and said operable mechanism comprising a cable having one end portion arranged for securement with respect to said bed, the other end portion passing through said hitch tongue and terminating with a free actuating end at the forward portion of the tongue, the intermediate portion of said cable being threaded over sheave means comprising sheaves connected with the head end of the bed and rear end of the hitch tongue respectively whereby said cable is disposed in diagonal fashion between opposite outward pivotal members when said bed and hitch tongue are vertically spaced while in transportable relation, a releasable cable clamping means carried by said tongue to grasp said cable and to maintain the intermediate portion thereon in tension for maintaining said bed and hitch tongue in coplanar positions after said latter units are so disposed from pulling on the free actuating end of the cable.

8. In a trailer, the combination of a bed, a foldable gooseneck connected with said bed, and operable mechanism connecting said bed and gooseneck and arranged to move said bed and gooseneck relatively to each other from transportable vertically spaced positions to aligned coplanar positions, said gooseneck comprising a hitch tongue, parallel links, and pivotal members connecting the ends of said links with said hitch tongue and bed respectively, and said operable mechanism comprising a cable having one end portion arranged for securement with respect to said bed, the other end portion passing through said hitch tongue and terminating with a free actuating end at the forward portion of the tongue, the intermediate portion of said cable being threaded over sheave means comprising sheaves each mounted for free rotation upon diagonally disposed link pivotal members on the hitch tongue and bed, respectively, considered with the bed and tongue in vertical spaced positions.

9. In a trailer, the combination of a bed, a foldable gooseneck connected with said bed, and operable mechanism connecting said bed and gooseneck and arranged to move said bed and gooseneck relatively to each other from transportable vertically spaced positions to aligned coplanar positions, said gooseneck comprising a hitch tongue, parallel links, and pivotal members connecting the ends of said links with said hitch tongue and bed, respectively, and said operable mechanism comprising a cable having one end portion arranged for securement with respect to said bed, the other end portion passing through said hitch tongue and terminating with a free actuating end at the forward portion of the tongue, the intermediate portion of said cable being threaded over sheave means comprising sheaves each mounted for free rotation upon diagonally disposed link pivotal members on the hitch tongue and bed, respectively, considered with the bed and tongue in vertical spaced positions, and securing mechanism to tie said hitch tongue and bed together when said tongue and bed are actuated into coplanar positions by said cable.

10. In a trailer, a load carrying bed, a hitch tongue for said bed, swingable mechanism to connect said tongue with said bed, said swingable mechanism being constructed and arranged to cause relative movement between said tongue and said bed both in longitudinal and vertical directions, and operative means for actuating said tongue relative to said bed between vertically separated and horizontally aligned positions comprising a cable having one end connected with said bed and another end connected with said tongue, and sheave means on said bed and tongue respectively to dispose the intermediate portion of said cable diagonally between the bed and tongue whereby the tensioning of one end of said cable will cause relative movement between said bed and tongue both longitudinally and vertically in a direction to bring said bed and tongue into horizontal alignment, while the relaxing of said one end of said cable will allow relative movement between said bed and the tongue in a direction to dispose said bed and tongue in vertically separated positions.

11. In a trailer, a load carrying bed, a hitch tongue for said bed, cooperative mechanisms connected with said hitch tongue to provide a hitch means for connection with a towing vehicle when said tongue is carried in vertically separated position with respect to said bed and to provide a ramp for said bed when said tongue is disposed in horizontally aligned position with respect to said bed, and swingable means operably connecting said bed and tongue to actuate said bed and tongue relatively both horizontally and vertically between the aforesaid two positions comprising a cable passing through said tongue and having connection with said bed, sheave means on said tongue and bed, said cable having its intermediate portion trained over said sheave means, said sheave means being located to position an intermediate portion of said cable diagonally between said bed and tongue whereby tensioning of the tongue end of said cable causes relative horizontal and vertical movement between said bed and tongue to bring them into horizontal alignment, while relaxing of said tongue end of the cable will cause relative horizontal and vertical movement between said bed and tongue to bring them into vertically separated positions.

12. In a folding gooseneck for a trailer comprising a bed member, a hitch tongue member, and swingable means interposed between said members and connecting such members for relative movement, said swingable means being constructed and arranged to shift said tongue member with respect to said bed member between vertically separated positions and aligned horizontal positions, the improvement which comprises a cable having one end secured to said bed member, the other end of said cable passing along said tongue member for connection with a power source, both of said members having cooperative guide means for an intermediate portion of said cable with said guide means spaced vertically and fore and aft of said swingably connected members to position said intermediate portion of said cable in the general direction of the shift of said tongue member with respect to said bed member, whereby tensioning and relaxing of said cable causes relative movement between said members and between said aligned and separated positions thereof.

13. In a folding gooseneck for a trailer comprising a bed member, a hitch tongue member, and swingable means interposed between said members and connecting such members for relative movement, said swingable means being constructed and arranged to shift said tongue member with respect to said bed member between vertically separated positions and aligned horizontal positions, the improvement which comprises a cable having one end secured to said bed member, the other end of said cable passing along said tongue member for connection with a power source, both of said members having cooperative guide means for an intermediate portion of said cable with said guide means spaced vertically and fore and aft of said swingably connected members to position said intermediate portion of said cable in the general direction of the shift of said tongue member with respect to said bed member, whereby tensioning and relaxing of said cable causes relative movement between said members and between said aligned and separated positions thereof, and cable gripping mechanism carried by one of said members to hold both members in selected relative positions.

14. In a folding gooseneck for a trailer comprising a bed member, a hitch tongue member, and swingable means interposed between said members and connecting such members for relative movement, said swingable means being constructed and arranged to shift said tongue member with respect to said bed member between vertically separated positions and aligned horizontal positions, the improvement which comprises a cable having one end secured to said bed member, the other end of said cable passing along said tongue member for connection with a power source, both of said members having cooperative guide means for an intermediate portion of said cable with said guide means spaced vertically and fore and aft of said swingably connected members to position said intermediate portion of said cable in the general direction of the shift of said tongue member with respect to said bed member, whereby tensioning and relaxing of said cable causes relative movement between said members and between said aligned and separated positions thereof, and cable guide structure connected with the free end of said tongue member whereby the extended end of said cable is adapted for bodily lifting and lowering said connected bed and tongue members through the action of said power source.

15. A trailer comprising a bed, hitch tongues at each end thereof, swingable link means to connect each tongue with the bed respectively, and actuating mechanism to move either or both of said tongues into alignment with said bed or to maintain either or both of said tongues in vertically spaced relationship with respect to said bed comprising a cable having one end secured to one tongue, cooperative sheave means carried upon the adjacent ends of each tongue and the bed respectively whereby to dispose intermediate portions of said cable in predetermined positions between each tongue and bed end respectively, said cable extending along said bed, and the other end of said cable extending along the other tongue and outwardly away from the free end thereof for connection with a power source, and cable gripping mechanisms carried by each of said tongues and by the adjacent ends of said bed and fore and aft of the intermediate portions of said cable, and cooperative sheave means to secure the cable at selective positions in relation to either of said tongues and/or the ends of said bed.

16. A trailer comprising a bed, hitch tongues at each end thereof, swingable link means to connect each tongue with the bed respectively, and actuating mechanism to move either or both of said tongues into alignment with said bed or to maintain either or both of said tongues in vertically spaced relationship with respect to said bed comprising a cable having one end secured to one tongue, cooperative sheave means carried upon the adjacent ends of each tongue and the bed respectively whereby to dispose intermediate portions of said cable in predetermined positions between each tongue and bed end respectively, said cable extending along said bed, and the other end of said cable extending along the other tongue and outwardly away from the free end thereof for connection with a power source, and cable gripping mechanisms carried by each of said tongues and by the adjacent ends of said bed and fore and aft of the intermediate portions of said cable, and cooperative sheave means to secure the cable at selective positions in relation to either of said tongues and/or the ends of said bed, and hitch units connected with each of said tongues for releasable connection with mobile equipment, said actuating mechanism being adapted to dispose said tongues and bed in predetermined relative positions with respect to said mobile equipment with either or both tongues connected therewith.

17. In a mobile trailer assembly having detachable wheel structures, said assembly being constructed and arranged for conversion into a bridge unit comprising a bed, a gooseneck connected with one end of said bed, a second gooseneck connected with the other end of said bed, each of said goosenecks comprising articulately connected and relatively foldable sections to provide a ramp structure for the adjacent edge of the bed when said sections are manipulated into the general plane of said bed, said sections of each gooseneck providing a hitch structure for fifth wheel connection when raised above the level of the general plane of the bed, and mechanism interconnecting both of said goosenecks and said goosenecks with said bed, said mechanism being operatively constructed and arranged to vary the position of said bed with respect to each of said goosenecks or said goosenecks with respect to each other.

18. In a folding gooseneck structure for a trailer comprising a bed member, a hitch tongue member, and swingable means interposed between said members and connecting such members for relative movement, said swingable means being constructed and arranged to shift said tongue member with respect to said bed member between vertically separated positions and aligned horizontal positions, the improvement which comprises a cable mechanism constructed and arranged to coact with said swingable means and having one end portion of said cable mechanism connected with one of the aforesaid members, the other end portion of said cable mechanism being carried by the other of said members and arranged to extend outwardly therefrom for operative connection with an external power pulling source, and cooperative guide means carried by each of said members respectively to dispose an intermediate portion of said cable mechanism in predetermined independent coacting relation with respect to said swingable means but extending between said tongue and bed members whereby tensioning of said cable mechanism by said external power pulling source causes said swingable means to move said members into aligned positions from vertically separated locations and whereby relaxing of tension by said pulling source on said cable mechanism causes said swingable means to move said members from aligned positions into vertically separated positions.

19. In a folding gooseneck structure for a trailer comprising a bed member, a hitch tongue member, and swingable means interposed between said members and connecting such members for relative movement, said swingable means being constructed and arranged to shift said tongue member with respect to said bed member between vertically separated positions and aligned horizontal positions, the improvement which comprises a cable mechanism constructed and arranged to coact with said swingable means and having one end portion of said cable mechanism connected with one of the aforesaid members, the other end portion of said cable mechanism being carried by the other of said members and arranged to extend outwardly therefrom for operative connection with an external power pulling source, and cooperative guide means carried by each of said members respectively to dispose an intermediate portion of said cable mechanism in predetermined independent coacting relation with respect to said swingable means but extending between said tongue and bed members whereby tensioning of said cable mechanism by said external power pulling source causes said swingable means to move said members into aligned positions from vertically separated locations and whereby relaxing of tension by said pulling source on said cable mechanism causes said swingable means to move said members from aligned positions into vertically separated positions, and locking means for said cable mechanism carried by one of said members for coactive retaining engagement with said cable mechanism be releasably secure said cable mechanism with respect to said one member for any one given relative position of said members.

References Cited in the file of this patent

UNITED STATES PATENTS

| Number | Name | Date |
|---|---|---|
| 2,141,529 | Gravelle | Dec. 27, 1938 |
| 2,325,869 | Mosling | Aug. 3, 1943 |
| 2,350,841 | Troche et al. | June 6, 1944 |
| 2,431,436 | Townsend | Nov. 25, 1947 |
| 2,443,611 | Ferguson | June 22, 1948 |
| 2,590,962 | Gurton et al. | Apr. 1, 1952 |

FOREIGN PATENTS

| Number | Country | Date |
|---|---|---|
| 580,879 | Great Britain | Sept. 23, 1946 |